Oct. 11, 1955  B. L. TAYLOR  2,720,285
SAFETY WHEEL CHOCK
Filed Jan. 12, 1955

INVENTOR.
BERT L. TAYLOR
BY
Sanford Schnurmacher
ATTORNEY

United States Patent Office 2,720,285
Patented Oct. 11, 1955

2,720,285

SAFETY WHEEL CHOCK

Bert L. Taylor, Cleveland, Ohio

Application January 12, 1955, Serial No. 481,445

5 Claims. (Cl. 188—32)

This invention relates to chocking devices for vehicle wheels or the like and has particular reference to apparatus employed for securing the wheels of motor vehicles against movement upon inclines, or the like.

The primary object of this invention resides in the provision of a combination of elements which affords a convenient means for stabilizing a vehicle, such as an automobile or truck, while one or more of the wheels are raised by a jack, or similar device, in tire changing operations.

Another object is to provide a safety device by which vehicles, parked along streets and roadways, can be secured against accidental movement when brakes have not been set, or in the event of failure of the brakes, thus minimizing the hazard of street and highway accidents.

A further object is to provide such a chock that can be applied to or removed from the vehicle wheel while the user remains in a standing position and entirely clear of the vehicle structure at all times, so that any accidental movement of the vehicle cannot result in injury to the user.

Still another object is to provide apparatus that is simple and economical in structure and sufficiently compact as to be conveniently carried in the tool compartment of the vehicle for ready use at all times.

These and other objects of the invention will become apparent upon the reading of the following specification and claims, together with the accompanying drawing, wherein;

Figure 3:
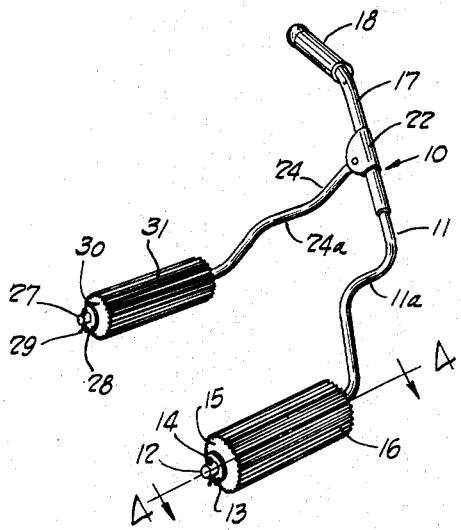
Figure 3 is a perspective view of the wheel chock that is the subject of this invention.
Figure 4:
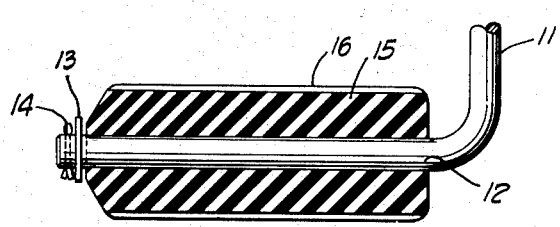
Figure 4 is a horizontal sectional view of one of the roller members, taken along the line and in the direction of the arrows 4—4 of the Figure 3.

Referring more particularly to the drawing, there is seen in the Figure 3 the wheel chock that is the subject of this invention broadly indicated by the reference numeral 10.

The device comprises two main elements, the leg 11 and the arm 24 pivotally connected thereto through the pivot plate 22. Both the leg 11 and the arm 24 may be fabricated from steel rod or tubing of suitable gage. In the preferred form, illustrated, they are made from solid rod stock. A tubular handle 17 is fitted to the upper end of the leg 11 in a tight pressed or welded fit.

Figure 5:
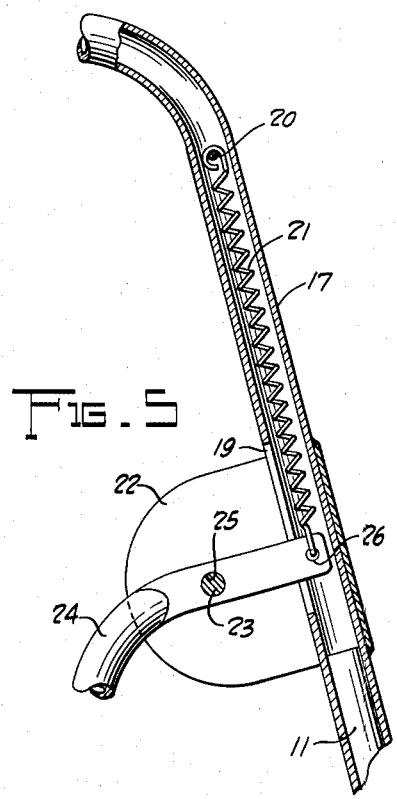
Figure 5 is an enlarged view, partly in section of the pivot plate and handle, showing the manner of connecting the leg and arm members.

Reference numeral 22 indicates a substantially V-shaped pivot plate that is mounted on the leg assembly at the base of the handle 17. The pivot plate 22 has a pivot pin 23 mounted between the sides thereof. The handle 17 has a hand grip 18 on the upper end thereof and a slot 19 in the wall thereof opposite the pivot pin 23, as is seen most clearly in Figure 5.

The lower end of the leg 11 is bent sharply laterally at an angle of 90° to form a foot or bearing shaft 12 that is parallel to the ground when the device is held upright.

A solid roller 15 is journaled on the foot 12 and is held in place by washer 13 and cotter pin 14. The roller is freely rotatable on the leg 12. In the form illustrated, the roller 15 is about 12 inches long and 3¾ inches in diameter. The surface of the roller has a plurality of longitudinally extending and circumferentially spaced ribs 16 that present a gripping surface to both the wheel and ground when in use. Any other type of gripping surface may be used, such as criss-crossed ribs or a surface of sharp grits held on by a suitable adhesive. The leg 11 is offset at 11a to bring the handle 17 into a position spaced outwardly of the face of the wheel 32 and tire 33 when the chock is in position as illustrated in Figures 1 and 2.

The arm 24 is pivotally mounted proximate its upper end on pivot pin 23 which passes through hole 25 in the arm 24. The extreme upper end of the arm 24 extends through slot 19 into the interior of the hollow handle 17, as is seen most clearly in Figure 5. Reference numeral 21 indicates a coil spring which is mounted within the tubular handle 17 and secured thereto at one end by means of a pin 20. The other end of the spring is locked in a hole 26 located at the extreme upper end of the arm 24. The normal pull of the spring 21 acts to bias the lower end of the arm 24 toward the leg 11. The lower end of the arm 24 is bent laterally at a 90° angle to form the foot 27 upon which is journaled the roller 30, which is similar in structure to the leg roller 15. Roller 30 is held in place on the arm foot 27 by means of washer 28 and cotter pin 29. The arm 24 has an offset portion 24a which corresponds to the offset 11a of the leg and serves the same purpose. When so assembled, the rollers 15 and 30 are parallel to one another and are normally drawn toward one another by the action of the spring 21. When the roller 30 is held on the ground, the roller 15 may be moved away from it by pressing down on the handle hand grip 18 and may be moved toward it by lifting up on the hand grip 18.

Figure 1:
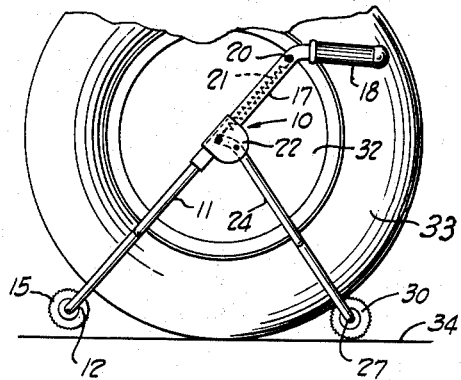
Figure 1 is a side elevational view of a vehicle wheel, showing the chock that is the subject of this invention as it appears during the period it is being applied to the wheel.
Figure 2:
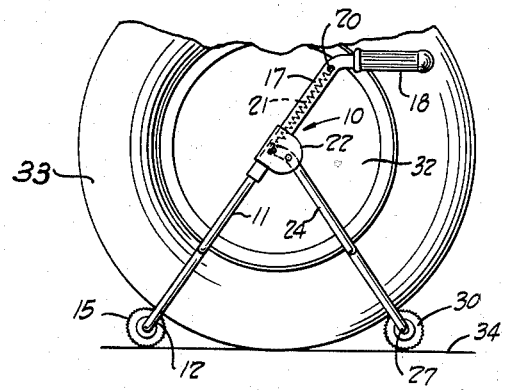
Figure 2 is a side elevational view of the wheel and chock, showing the chock in locked position against the wheel.

Referring to Figures 1 and 2, there is seen a wheel 32 having a tire 33 mounted thereon and resting on the ground 34. To apply the chock 10 to the wheel, the roller 30 is positioned in front of tire 33 as illustrated in Figure 1. The roller 15 is moved away from the roller 30 by pressing down on the handle grip 18. When the distance between rollers 15 and 30 is great enough to clear the tire 33, the grip 18 is released. Thereupon the action of the spring 21 will cause the leg 11 and roller 15 to be drawn against the tire 33 toward the arm 24 and roller 30, as shown in Figure 2. The rollers 15 and 30 will now be held snugly against both sides of the tire 33, while at the same time resting on the ground 34. The rollers can be firmly wedged against the tire 33 by pulling up hard on the handle grip 18.

Due to the offsets 24a and 11a in the leg and arm members 24 and 11 respectively, the application of the chock to the tire can be made while the user is entirely clear of the wheel structure. Due to the fact that the rollers 15 and 30 are free to rotate, they can be easily rolled into a wedged position against the tire without requiring the user to get down upon the ground to push them into place or require him to use his foot to shove them into place. Thus, one of the primary causes of accidents which accompany the use of flat, triangular or wedge shaped chocks is overcome.

To remove the chock, it is only necessary to press down on the handle grip 18 which causes the leg 11 to pivot outward relative to the arm 24 to bring the roller 15 into the original position illustrated in Figure 1. Again, due to the free rolling action of the rollers 15 and 30, they may be easily disengaged, when intentional, from the tire 33 by suitably directing the pressures on the handle grip 18. In the case of flat surfaced chocks, once wedged between the tire and ground, the pinching action between the tire, wedge and ground makes it very difficult to disengage such a chock without extending some part of the user's arms, hands or feet into the line of movement of the vehicle. In such a case, any slight accidental movement of the wheel occasioned by the removal of the chock may trap him and cause serious injury.

The instant device is not only safe and certain in action to chock vehicle wheels, but may also be used to hold any circular object such as large oil drums, barrels or cable reels, against rolling action.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claims.

I claim:

1. A chock for vehicle wheels, comprising in combination, a leg member including a handle portion at its upper end and a laterally extending foot at its lower end, an arm member pivotally mounted on the leg below the handle portion including a laterally extending foot at its lower end, and a roller journaled on each of the said feet, the rollers being parallel to one another and movable toward one another upon upward movement of the handle and away from one another upon downward movement of the handle.

2. A chock for vehicle wheels, comprising in combination, a leg member including a handle portion at its upper end and a laterally extending foot at its lower end, an arm member pivotally mounted on the leg below the handle portion including a laterally extending foot at its lower end, and a roller journaled on each of said feet, the peripheral face of each of the rollers having a plurality of spaced longitudinally extending ribs formed thereon, the said rollers being parallel to one another and movable toward one another upon upward movement of the handle and away from one another upon downward movement of the handle.

3. A chock for vehicle wheels, comprising in combination, a leg member including a handle portion at its upper end and a laterally extending foot at its lower end, an arm member pivotally mounted on the leg below the handle portion, including a laterally extending foot at its lower end, and a roller journaled on each of said feet, the peripheral face of each roller having a friction creating pattern thereon, the said rollers being parallel to one another and movable toward one another upon upward movement of the handle and away from one another upon downward movement of the handle.

4. A chock for vehicle wheels, comprising in combination, a leg member including a handle portion at its upper end and a laterally extending foot at its lower end, an arm member pivotally mounted on the leg below the handle portion, including a laterally extending foot at its lower end, a roller journaled on each of the said feet, the rollers being parallel to one another, and spring means connecting the leg and arm, acting to normally bias the rollers toward one another.

5. A chock for vehicle wheels, comprising in combination, a leg member including a tubular handle portion at its upper end and a laterally extending foot at its lower end, a pivot plate mounted on the leg at the base of the handle, the said tubular handle having a slot in the wall thereof at the pivot plate and a pin mounted cross-wise of the interior thereof, proximate its upper end, an arm member pivotally mounted on the pivot plate with its extreme upper end, beyond the pivot point, extended through the handle slot, the arm also having a laterally extending foot at its lower end positioned parallel to the leg foot, a roller journaled on each of the feet, and a spring positioned in the handle connecting the pin and upper end of the arm to normally bias the arm and its supported roller toward the leg roller.

References Cited in the file of this patent

UNITED STATES PATENTS

| | | |
|---|---|---|
| 1,407,338 | Skiles | Feb. 21, 1922 |
| 2,461,248 | Wright | Feb. 8, 1949 |

FOREIGN PATENTS

| | | |
|---|---|---|
| 35,793 | Switzerland | Jan. 26, 1906 |